United States Patent [19]

Belisle et al.

[11] Patent Number: 5,440,466
[45] Date of Patent: Aug. 8, 1995

[54] FLOURESCENT LIGHTING FIXTURE RETROFIT UNIT AND METHOD FOR INSTALLING SAME

[75] Inventors: William W. Belisle, Newark; Robert A. Catone, Granville; John C. McCartney; Robert D. Zeller, both of Newark, all of Ohio

[73] Assignee: Holophane Lighting, Inc., Newark, Ohio

[21] Appl. No.: 192,567

[22] Filed: Feb. 7, 1994

[51] Int. Cl.⁶ ............................................. F21V 17/00
[52] U.S. Cl. .................................. 362/222; 362/221; 362/223; 362/225; 362/260
[58] Field of Search ................ 362/217, 221, 260, 282, 362/322, 222, 223, 374, 375, 225

[56] References Cited

U.S. PATENT DOCUMENTS

| | | | |
|---|---|---|---|
| 2,120,449 | 6/1938 | Vanderveld | 362/375 |
| 2,530,582 | 11/1950 | Neuman | 362/223 X |
| 2,951,611 | 9/1960 | Tillson et al. | 362/221 X |
| 3,340,393 | 9/1967 | Franck et al. | 362/375 X |
| 4,088,881 | 5/1978 | Neer et al. | 362/223 |
| 4,093,974 | 6/1978 | Wheeler | 362/216 |
| 4,336,576 | 6/1982 | Crabtree | 362/240 |
| 4,536,830 | 8/1985 | Wisniewski | 362/223 |
| 4,599,684 | 7/1986 | Lee | 362/346 |
| 4,689,729 | 8/1987 | Ruud et al. | 362/375 |
| 4,748,543 | 5/1988 | Swarens | 362/147 |
| 4,799,134 | 1/1989 | Pinch et al. | 362/217 |
| 4,928,209 | 5/1990 | Rodin | 362/217 |
| 5,062,030 | 10/1991 | Figueroa | 362/347 |
| 5,132,886 | 7/1992 | Hoag et al. | 362/221 |
| 5,207,504 | 5/1993 | Swift et al. | 362/260 |
| 5,274,533 | 12/1993 | Neary et al. | 362/221 X |

FOREIGN PATENT DOCUMENTS 636316 2/1962 Canada.

*Primary Examiner*—Stephen F. Husar
*Attorney, Agent, or Firm*—Brooks & Kushman

[57] ABSTRACT

A retrofit unit for a fluorescent lighting fixture having a housing with an open face and a method for installing same. The retrofit unit includes a reflector plate for covering the open face of the housing and brackets for attaching the reflector plate to the housing. The reflector plate has slots formed therein which cooperate with the brackets for adjusting the reflector plate to fit the housing. At least one of the brackets acts as a hinge allowing the reflector plate to rotate away from the open face of the housing. The method includes providing the reflector plate and brackets, as well as inserting a bracket in a slot, adjusting the brackets relative to the slots, and adjusting fasteners relative to the brackets.

18 Claims, 3 Drawing Sheets

FLOURESCENT LIGHTING FIXTURE RETROFIT UNIT AND METHOD FOR INSTALLING SAME

TECHNICAL FIELD

This invention relates generally to fluorescent lighting fixtures. More particularly, this invention relates to a retrofit unit for fluorescent lighting fixtures and a method for installing same.

BACKGROUND ART

Worldwide, millions of surface-mounted and pendant-mounted strip fluorescent lighting fixtures have been installed in schools, offices, hospitals, stores and other areas since the 1950's. These fixtures typically include a plurality of fluorescent lamps as well as electromagnetic ballasts, including a transformer and a power capacitor, to control the corresponding lamps.

Since the installation of these fixtures, however, a great number of improvements have been developed in fluorescent lighting technology. As a result, a wide variety of new and highly efficient fluorescent lamps and electronic ballasts are now available. This fact, together with the advancing age of the fluorescent fixtures referenced above, has rendered these lighting fixtures increasingly costly to operate and maintain in comparison to newer model fluorescent lighting fixtures.

One way to reduce the high operating and maintenance costs associated with these older model fluorescent lighting fixtures is simply to replace them with newer, more efficient models. Given the number of fixtures that ordinarily require replacement, however, such a solution can itself be extremely expensive.

Moreover, replacement of the electromagnetic ballasts typically used in the older model fluorescent fixtures can create an additional problem. Many of these ballasts contain materials that can prove difficult and costly to dispose of in view of applicable environmental rules and regulations.

It is well known that the high operating and maintenance costs associated with older model fluorescent lighting fixtures may be reduced through the use of improved reflectors. As exemplified by U.S. Pat. No. 5,062,030 issued to Figueroa and U.S. Pat. No. 4,335,576 issued to Crabtree, fluorescent lighting fixture reflectors have been re-designed such that more light from the fluorescent lamps is directed from the fixture into the workspace. As a result, the number of lamps in the fixture may be reduced without significantly reducing overall illumination from the lighting fixture.

However, such reflector redesign and reduced lamping does not address the problem discussed above regarding the continued operation of inefficient electromagnetic ballasts. Moreover, even with an improved reflector, an older fluorescent lighting fixture may require either the continued use of the less efficient lamps for which it was originally designed, or specially manufactured new lamps. Finally, an improved reflector also does not address the maintenance problems associated with the remainder of the fluorescent lighting fixture, such as louvers, diffusers, lenses, or various mechanical components.

It is also known that costs associated with replacement of older fluorescent lighting fixtures can be reduced through retrofitting. Retrofitting involves replacing only certain parts of an existing fluorescent lighting fixture, while retaining the remainder of the fixture. As is readily apparent, the costs of retrofitting vary depending on the extent of replacement associated with the existing fluorescent lighting fixture. The extent of replacement, in turn, directly affects the extent of savings with respect to future operating and maintenance costs.

A typical fluorescent retrofit unit is shown in U.S. Pat. No. 5,207,504 issued to Swift et al. As disclosed therein, with the exception of the original fixture housing and the fluorescent lamp sockets, the existing lighting fixture is replaced with new components. However, retrofit units such as these also suffer from a variety of problems.

More specifically, such retrofit units can prove both awkward and time consuming to install and inspect. For installation, the existing electromagnetic ballast must be disconnected, removed, and then replaced by an electronic ballast, which itself must then be properly wired to both the fixture power supply and the existing lamp sockets. A lamp cover, reflector and lens must then be separately assembled to the fixture and later removed if proper electrical inspection of the installation has not already taken place.

Moreover, where existing fluorescent lamp sockets are not replaced, the retrofit fixture may again require either the continued use of the less efficient lamps for which those sockets were originally designed, or specially manufactured new lamps. Finally, such retrofit units do not address the previously discussed problem of disposal associated with the removal of existing electromagnetic ballasts.

Thus, an improved retrofit unit for a fluorescent lighting fixture and a method for installing same are needed not only for reducing operating and maintenance costs as well as replacement costs associated with the existing lighting fixture, but also for easing installation and inspection. An improved retrofit unit and method for installing same are also needed to address the problems associated with both the continued operation or disposal of existing fluorescent lighting fixture electromagnetic ballasts.

Disclosure Of Invention

Accordingly, it is the principle object of the present invention to provide an improved fluorescent lighting fixture retrofit unit and method for installing same.

Another object of the present invention is to provide a fluorescent lighting fixture retrofit unit and method for installing same that solve the disposal problem associated with the replacement of original fluorescent lighting fixture ballasts.

Another object of the present invention is to provide a fluorescent lighting fixture retrofit unit and method for installing same that are compatible with a wide variety of existing fluorescent lighting fixture housings.

Another object of the present invention is to provide a fluorescent lighting fixture retrofit unit and method for installing same having a reflector plate that may be hinged to an existing lighting fixture housing so that the reflector plate may rotate away from the housing for easier access thereto during installation of the retrofit unit.

According to the present invention, a fluorescent lighting fixture retrofit unit is provided. The retrofit unit incorporates a reflector plate for covering the open face of the housing, the reflector plate having a plurality of reflector plate slots formed therein. The retrofit unit further incorporates a plurality of brackets for attaching the reflector plate to the housing. In operation, each bracket cooperates with one of the plurality of reflector plate slots for adjusting the reflector plate to fit the housing. At least one of the brackets further acts as a hinge so as to allow the reflector plate to rotate away from the open face of the housing.

Also according to the present invention, the bracket disclosed above which acts as a hinge is provided with a first retaining flange for engaging the reflector plate. This flange has a width greater than that of the associated reflector plate slot. A second retaining flange is also provided which is adapted to receive a fastener for fastening the second retaining flange to the housing. Each bracket is further provided with a neck portion, having a width less than the width of the associated reflector plate slot, which is interposed between the first and second retaining flanges. The neck portion extends through the associated reflector plate slot so that the first and second retaining flanges are disposed on opposite sides of the reflector plate. In operation, the reflector plate is permitted to rotate away from the open face of the housing via the neck portion and first retaining flange of the bracket and the associated reflector plate slot.

Still further according to the present invention, a method for installing the fluorescent retrofit unit of the present invention is provided. The method is for use with a fluorescent lighting fixture having a housing with a length, width, and an open face. The method comprises providing a reflector plate having a plurality of reflector plate slots formed therein, as disclosed above, for covering the open face of the housing. The method also comprises providing a plurality of brackets each having a first retaining flange, second retaining flange, and a neck portion, as disclosed above, cooperating with an associated reflector plate slot for attaching the reflector plate to the housing. The method further comprises inserting the neck portion of at least one bracket through an associated reflector plate slot so that the first and second retaining flanges of the bracket are disposed on opposite sides of the reflector plate such that the reflector plate may rotate away from the open face of the housing via the neck portion and first retaining flange of the bracket and the associated reflector plate slot. The method still further comprises adjusting each bracket relative to the associated reflector plate slot to selectively position the reflector plate across the width of the housing, and adjusting a fastener relative to a flange slot formed in the second retaining flange of each bracket to selectively position the reflector plate across the length of the housing.

These and other objects, features and advantages will be readily apparent upon consideration of the following description and drawings.

BEST MODES FOR CARRYING OUT THE INVENTION

Figure 1:
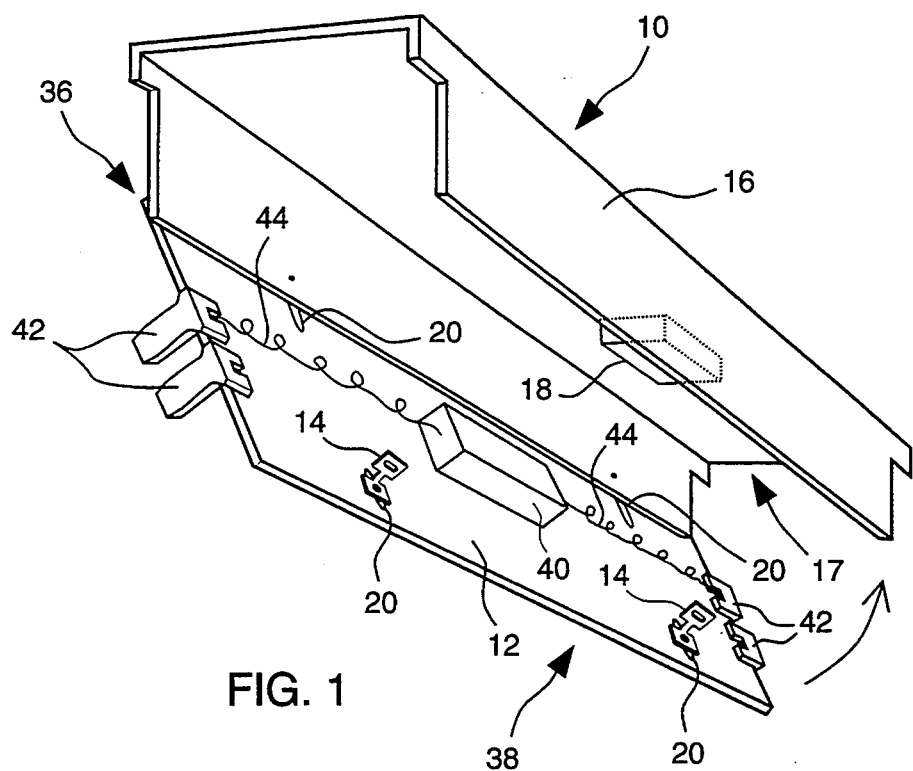
FIG. 1 is a perspective view of the fluorescent retrofit unit of the present invention, rotated away from an existing lighting fixture housing.

Referring now to FIG. 1, a perspective view of the fluorescent retrofit unit of the present invention is shown, designated generally by reference numeral 10. As seen therein, the fluorescent retrofit unit (10) comprises a reflector plate (12) and a plurality of brackets (14). The brackets (14) are designed to attach the reflector plate to the housing (16) of an existing fluorescent lighting fixture.

The housing (16) has an open face (17) formed therein and acts as an electrical enclosure inside which the ballast (18) as well as fixture and supply wiring (not shown) are contained. It is the housing (16) and these electrical components that are retained for use in conjunction with the fluorescent retrofit unit (10) of the present invention. The remaining components of the existing fluorescent lighting fixture, such as the louver, diffuser or lens, lamps, lamp sockets and miscellaneous bracketry, are removed for replacement with new components as will be described in more detail below.

Significantly, since the entire fluorescent lighting fixture is not removed, no re-installation of the fixture is required with the fluorescent retrofit unit (10) of the present invention. Moreover, most of the cost of a fluorescent lighting fixture is in the suspension components, such as the housing, and the labor required to install the suspension components and distribute electrical power to the fixture. As a result, the fluorescent retrofit unit (10) of the present invention reduces future operating and maintenance costs, as well as replacement costs associated with that fixture.

Figure 2:
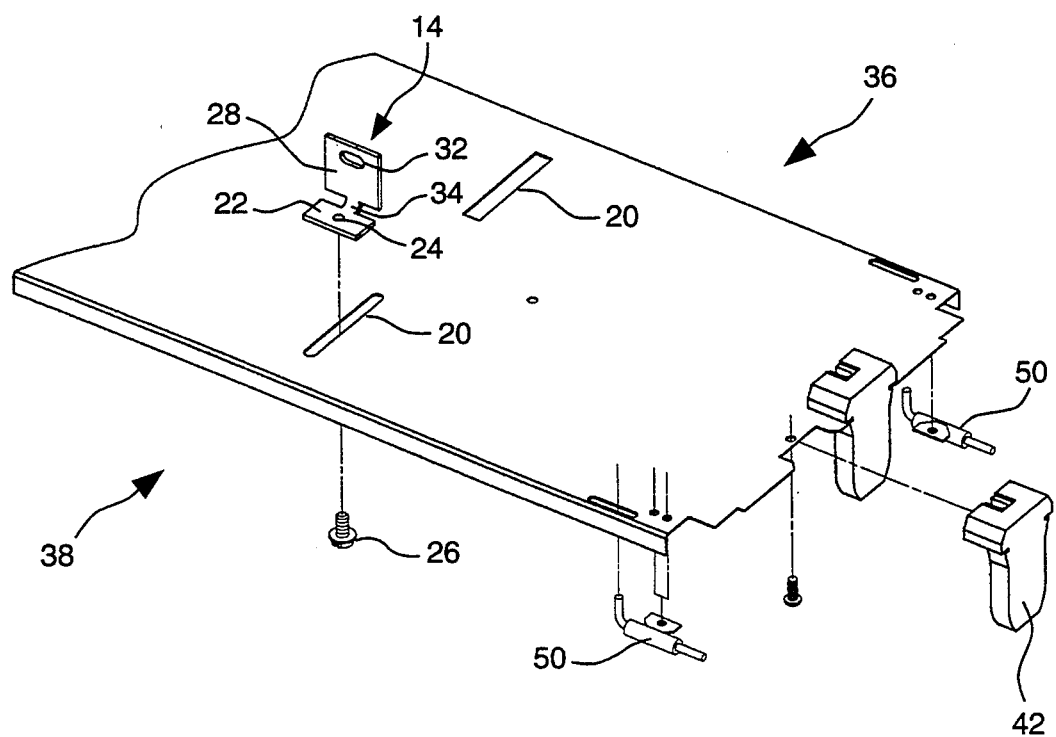
FIG. 2 is a partial perspective view of the fluorescent retrofit unit of the present invention.

Referring now to FIGS. 1 and 2, the reflector plate (12) of the fluorescent retrofit unit (10) of the present invention is preferably manufactured from 22 gauge steel for rigidity and has a white finish with a minimum reflectance of 87%. The reflector plate (12) includes a plurality of reflector plate slots (20) formed therein. Each reflector plate slot cooperates with one of the plurality of brackets (14) for attaching the reflector plate (12) to the housing (16) of the existing fluorescent lighting fixture.

To that end, reflector plate slots (20) are elongated in a direction perpendicular to the longitudinal axis of the housing (16). In such a fashion, brackets (14) may be adjusted relative to the reflector plate slots (20) to selectively position the reflector plate (12) as desired, preferably centered, across the width of the open face (17) of the housing (16). As a result, the fluorescent retrofit unit (10) of the present invention may be universally adjusted to any existing fluorescent lighting fixture, regardless of the width of the housing (16) thereof.

Figure 3:
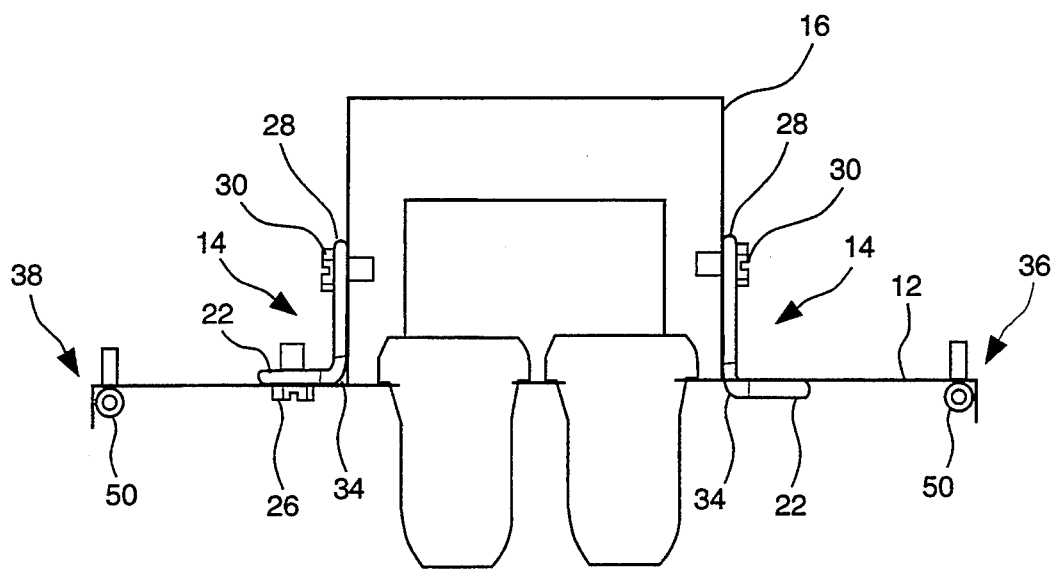
FIG. 3 is a side elevational view of the fluorescent retrofit unit of the present invention, mounted to an existing lighting fixture housing.

Referring now to FIGS. 2 and 3, a partial perspective view and side elevational view of the fluorescent retrofit unit (10) of the present invention are shown, respectively. As seen therein, bracket (14) comprises a first retaining flange (22) for engaging the reflector plate (12). The first retaining flange (22) is manufactured such that its width is greater than that of the associated reflector plate slot (20). The first retaining flange (22) preferably includes an opening (24) formed therein adapted to receive a fastener (26) for selectively fastening the first retaining flange (22) to the reflector plate, as will be described in greater detail below. Fastener (26) is preferably a number 10 sheet metal screw.

The bracket (14) further comprises a second retaining flange (28) adapted to receive a fastener (30) for fastening the second retaining flange (28) to the housing (16). The second retaining flange (28) is preferably manufactured such that its width is also greater than that of the associated reflector plate slot (20). The second retaining flange (28) is preferably adapted to receive the fastener (30) via a flange slot (32) formed therein. Fastener (30) is received by the housing (16) via either an existing opening therein, or an opening formed therein during the installation of the fluorescent retrofit unit (10) of the present invention. Fastener (30) is again preferably a number 10 sheet metal screw.

As seen in FIG. 2, the flange slot (32) of the bracket (14) is elongated in a direction parallel to the longitudinal axis of the housing (16). In such a fashion, brackets (14) may be adjusted relative to the housing to selectively position the reflector plate (12) as desired, preferably centered, across the length of the open face (17) of the housing (16). As a result, the fluorescent retrofit unit (10) of the present invention may again be universally adjusted to any existing fluorescent lighting fixture, regardless of the length of the housing (16) thereof.

The bracket (14) still further comprises a neck portion (34) interposed between the first and second retaining flanges (22,28). The neck portion (34) is manufactured such that its width is less than that of the associated reflector plate slot (20) in the reflector plate (12). As a result, as seen in FIG. 3, at least one, and preferably two, of the brackets (14) on the first edge (36) of the reflector plate (12) are received by the associated reflector plate slots (20) such that the neck portion (34) extends through the reflector plate slot (20) so that the first and second retaining flanges (22,28) are disposed on opposite sides of the reflector plate (12).

In such a fashion, after the second retaining flange (28) has been attached to the housing (16) via the fastener (30), the first retaining flange (22) engages the reflector plate (12) under the force of gravity such that the reflector plate (12) may rotate away from the open face (17) of the housing (16) via the neck portion (34) and first retaining flange (22) of the bracket (14), as well as the associated reflector plate slot (20). However, as also seen in FIG. 3, to permit the bracket (14) to so act as a hinge, the fastener (26), if installed, must be removed from the brackets (14). Preferably, then, for those brackets (14) intended to function as hinges, fastener (26) is omitted.

In contrast, for those brackets (14) not intended to function as hinges, typically those brackets (14) on the second edge (38) of the reflector plate (12), the first retaining flange (22) of the bracket (14) is preferably attached to the reflector plate (12) via fastener (26), opening (24), and reflector plate slot (20) such that both the first and second retaining flanges (22,28) are disposed on the same side of the reflector plate (12). In such a fashion, only the fasteners (30) need be removed from the brackets (14) on the second edge (38) of the reflector plate (12) to permit the reflector plate (12) to rotate away from the open face (17) of the housing (16) around the brackets (14) on the first edge (36) of the reflector plate (12).

After installation of the fluorescent retrofit unit (10) of the present invention, as seen in FIG. 3, the reflector plate (12) has a substantially perpendicular orientation relative to the housing (16). As a result, brackets (14) are preferably manufactured with a generally L-shaped structure such that the first and second retaining flanges (22,28) have a substantially perpendicular orientation relative to each other due to a curve imparted to the neck portion (34) of the bracket (14). The bracket (14) is also preferably manufactured from 14 gauge galvanized steel.

Referring again to FIG. 1, the fluorescent retrofit unit (10) of the present invention also comprises an electronic ballast (40) attached to the reflector plate (12) such that the ballast (40) is enclosed within the housing (16) when the reflector plate (12) is attached to the housing (16). The fluorescent retrofit unit (10) further comprises a plurality of fluorescent lamp sockets (42), preferably four, attached to the reflector plate (12) and pre-wired to the electronic ballast (40) via wiring (44).

The fluorescent retrofit unit (10) of the present invention is designed so the electromagnetic ballast (18) need not be removed, but only be disabled by disconnecting it from the fixture power supply. In such a fashion, the problems associated with either continued inefficient operation or disposal of the electromagnetic ballast (18) are eliminated. The electromagnetic ballast (18) is simply replaced by the more efficient electronic ballast (40) of the fluorescent retrofit unit (10) of the present invention and, along with the electronic ballast (40), the disabled electromagnetic ballast (18) is enclosed within the housing (16) when the reflector plate (12) is attached to the housing (16).

Such a design, together with the pre-wiring of the electronic ballast (40) to the fluorescent lamp sockets (42) allows the fluorescent retrofit unit (10) of the present invention to be more easily installed than typical retrofit units. More specifically, the electronic ballast (40) need only be wired to the fixture power supply (not shown) and not to existing fixture lamp sockets, which are removed and replaced by sockets (42). Sockets (42) also permit the retrofitted fixture to use standard high efficiency fluorescent lamps (not shown) which, together with electronic ballast (40), significantly reduce future operating and maintenance costs for the fixture.

Installation of the fluorescent retrofit unit (10) of the present invention is also eased by the brackets (14) acting as hinges, as described above. More specifically, via those brackets (14), the reflector plate (12) may be rotated and suspended under the force of gravity away from the open face (17) of the housing (16). Such a position of the reflector plate (12) allows for hands-free wiring of the electronic ballast (40) to the fixture power supply.

Such a position also allows for easy electrical inspection of the fluorescent retrofit unit (10) of the present invention and obviates the need for any type of electrical inspection access panel. The fluorescent retrofit unit (10) of the present invention is also constructed from lightweight components, which further eases installation by permitting such to be accomplished by only one worker.

Figure 4:
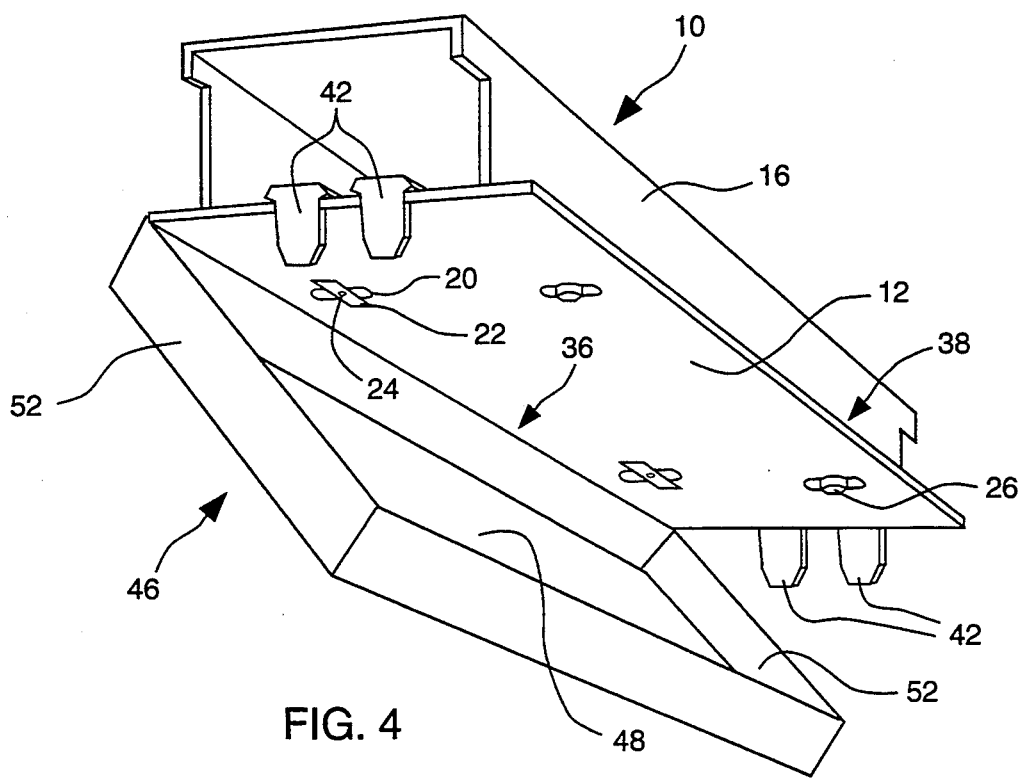
FIG. 4 is a perspective view of the fluorescent retrofit unit of the present invention installed on an existing fluorescent lighting fixture.

Referring now to FIG. 4, another perspective view of the fluorescent retrofit unit (10) of the present invention is shown, installed on an existing fluorescent lighting fixture. As seen therein, the fluorescent retrofit unit (10) further comprises a lamp cover (46) attachable to the reflector plate (12), and a lens (48) attachable to the lamp cover (46).

To facilitate attachment of the lamp cover (46) to the reflector plate (12), as seen in FIG. 2, the reflector plate (12) preferably includes a plurality of spring biased latches (50). The latches (50) are located at each of the four corners of the reflector plate (12) and also act as hinges to allow the lamp cover (46) and lens (48) to rotate away from the reflector plate (12). In such a fashion, the lamp sockets (42) of the fluorescent retrofit unit (10) of the present invention may be exposed for installation or replacement of high efficiency fluorescent lamps (not shown).

In the preferred embodiment, the lamp cover (46) comprises a pair of end caps (52), each end cap attached to one end of the reflector plate (12) adjacent the lamp sockets (42) via the latches (50). The lens (48) is preferably wrap-around, that is, extending from the first edge (36) to the second edge (38) of the reflector plate (12). The lens (48) is also preferably prismatic and manufactured from virgin acrylic plastic to control lamp brightness and distribute light properly within the workspace. The lamp cover (46) and lens (48) further contribute to the reduction of future maintenance costs associated with the retrofitted fixture by replacing aging corresponding components.

Figure 5:
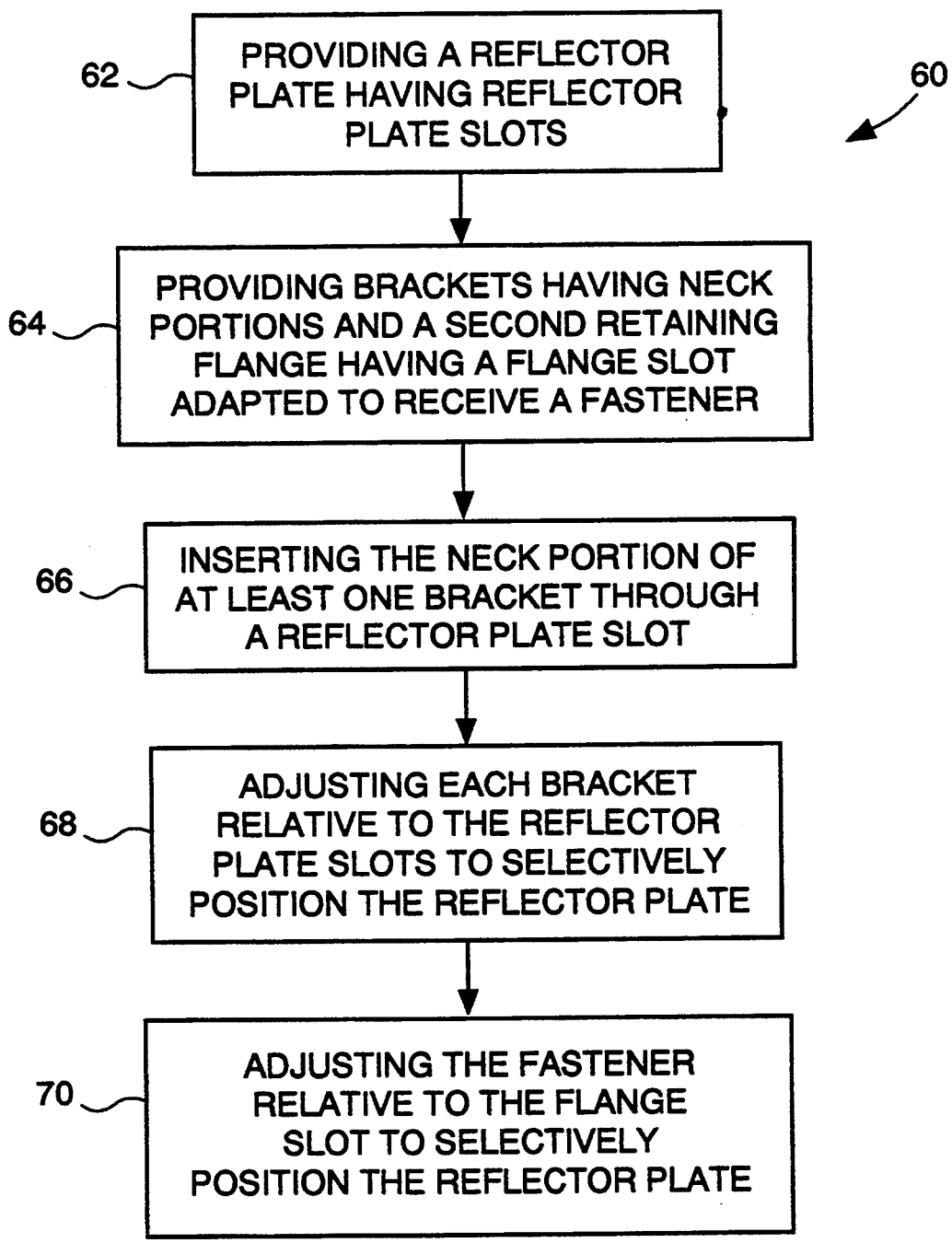
FIG. 5 is a block diagram of the method for installing the fluorescent retrofit unit of the present invention.

Referring finally to FIG. 5, a block diagram of the method of the present invention for installing a fluorescent lighting fixture retrofit unit is shown, designated generally by reference numeral 60. The method (60) is for use with a fluorescent lighting fixture having a housing with a length, width, and an open face. As seen therein, the method (60) comprises providing (62) a reflector plate for covering the open face of the housing, the reflector plate having a plurality of reflector plate slots formed therein as described above in detail with respect to the fluorescent retrofit unit (10) of the present invention.

The method (60) of the present invention also comprises providing (64) a plurality of brackets, each of the plurality of brackets cooperating with an associated reflector plate slot for attaching the reflector plate to the housing. As again described in detail above with respect to the fluorescent retrofit unit (10) of the present invention, each of the brackets provided comprise a first retaining flange having a width greater than that of the associated reflector plates slot for engaging the reflector plate, a second retaining flange having a flange slot formed therein adapted to receive a fastener for fastening the second retaining flange to the housing, and a neck portion having a width less than the width of the associated reflector plate slot interposed between the first and second retaining flanges.

The method (60) of the present invention further comprises inserting (66) the neck portion of at least one bracket through the associated reflector plate slot so that the first and second retaining flanges of the bracket are disposed on opposite sides of the reflector plate such that the reflector plate may rotate away from the open face of the housing via the neck portion and first retaining flange of the bracket and the associated reflector plate slot. The method (60) still further comprises adjusting (68) each bracket relative to the associated reflector plate slot to selectively position the reflector plate across the width of the housing, and adjusting (70) the fastener relative to the flange slot of the second retaining flange of each bracket to selectively position the reflector plate across the length of the housing.

The fluorescent lighting fixture retrofit unit (10) and method (60) for installing same of the present invention have been described and shown herein in conjunction with a fluorescent strip lighting fixture. However, it should be readily apparent that the fluorescent lighting fixture retrofit unit (10) and method (60) for installing same of the present invention are suitable for use in any application where retrofitting of a fluorescent lighting fixture may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A retrofit unit for a fluorescent lighting fixture having a housing with a length, a width, and an open face, the retrofit unit comprising:

a reflector plate for covering the open face of the housing, the reflector plate having a plurality of reflector plate slots formed therein; and a plurality of brackets for attaching the reflector plate to the housing, each bracket cooperating with one of the plurality of reflector plate slots to selectively position the reflector plate across the width of the housing, at least one of the plurality of brackets acting as a hinge allowing the reflector plate to rotate away from the open face of the housing.

2. The retrofit unit of claim 1 further comprising a ballast attached to the reflector plate, wherein the ballast is enclosed within the housing when the reflector plate is attached to the housing.

3. The retrofit unit of claim 2 wherein the ballast is a replacement ballast for replacing an original ballast within the housing, the original ballast being disconnected and enclosed within the housing when the reflector plate is attached to the housing.

4. The retrofit unit of claim 2 further comprising a plurality of fluorescent lamp sockets attached to the reflector plate.

5. The retrofit unit of claim 3 further comprising a plurality of fluorescent lamp sockets attached to the reflector plate.

6. The retrofit unit of claim 1 further comprising:
   a lamp cover attachable to the reflector plate; and
   a lens attachable to the lamp cover.

7. The retrofit unit of claim 2 further comprising:
   a lamp cover attachable to the reflector plate; and
   a lens attachable to the lamp cover.

8. The retrofit unit of claim 3 further comprising:
   a lamp cover attachable to the reflector plate; and
   a lens attachable to the lamp cover.

9. The retrofit unit of claim 4 further comprising:
   a lamp cover attachable to the reflector plate; and
   a lens attachable to the lamp cover.

10. The retrofit unit of claim 5 further comprising:
    a lamp cover attachable to the reflector plate; and
    a lens attachable to the lamp cover.

11. The retrofit unit of claim 1 wherein the at least one of the plurality of brackets acting as a hinge comprises:

a first retaining flange for engaging the reflector plate, the first retaining flange having a width greater than that of the associated reflector plate slot;

a second retaining flange adapted to receive a fastener for fastening the second retaining flange to the housing; and a neck portion interposed between the first and second retaining flanges, the neck portion having a width less than the width of the associated reflector plate slot, wherein the neck portion extends through the associated reflector plate slot so that the first and second retaining flanges are disposed on opposite sides of the reflector plate such that the reflector plate may rotate away from the open face of the housing via the neck portion and first retaining flange of the bracket and the associated reflector plate slot.

12. The retrofit unit of claim 11 wherein the second retaining flange of the bracket includes a flange slot formed therein for receiving the fastener, the flange slot allowing placement of the bracket to be adjusted relative to the housing to selectively position the reflector plate across the length of the housing.

13. A retrofit unit for a fluorescent lighting fixture having a housing with a length, a width, and an open face, the retrofit unit comprising:
- a reflector plate for covering the open face of the housing, the reflector plate having a plurality of reflector plate slots formed therein; and
- a plurality of brackets for attaching the reflector plate to the housing, each bracket cooperating with one of the plurality of reflector plate slots to selectively position the reflector plate across the width of the housing, at least one of the plurality of brackets acting as a hinge allowing the reflector plate to rotate away from the open face of the housing;
- a ballast attached to the reflector plate, wherein the ballast is enclosed within the housing when the reflector plate is attached to the housing; and
- a plurality of fluorescent lamp sockets attached to the reflector plate.

14. The retrofit unit of claim 13 wherein the at least one of the plurality of brackets acting as a hinge comprises:
- a first retaining flange for engaging the reflector plate, the first retaining flange having a width greater than that of the associated reflector plate slot;
- a second retaining flange adapted to receive a fastener for fastening the second retaining flange to the housing; and
- a neck portion interposed between the first and second retaining flanges, the neck portion having a width less than the width of the associated reflector plate slot, wherein the neck portion extends through the associated reflector plate slot so that the first and second retaining flanges are disposed on opposite sides of the reflector plate such that the reflector plate may rotate away from the open face of the housing via the neck portion and first retaining flange of the bracket and the associated reflector plate slot.

15. The retrofit unit of claim 14 wherein the second retaining flange of the bracket includes a flange slot formed therein for receiving the fastener, the flange slot allowing placement of the bracket to be adjusted relative to the housing to selectively position the reflector plate across the length of the housing.

16. The retrofit unit of claim 13 wherein the ballast is a replacement ballast for replacing an original ballast within the housing, the original ballast being disconnected and enclosed within the housing when the reflector plate is attached to the housing.

17. The retrofit unit of claim 13 further comprising:
- a lamp cover attachable to the reflector plate; and
- a lens attachable to the lamp cover.

18. A method for installing a retrofit unit for a fluorescent lighting fixture having a housing with a length, width, and an open face, the method comprising:
- providing a reflector plate for covering the open face of the housing, the reflector plate having a plurality of reflector plate slots formed therein;
- providing a plurality of brackets, each of the plurality of brackets cooperating with an associated reflector plate slot for attaching the reflector plate to the housing and comprising a first retaining flange having a width greater than that of the associated reflector plate slot for engaging the reflector plate, a second retaining flange having a flange slot formed therein adapted to receive a fastener for fastening the second retaining flange to the housing, and a neck portion having a width less than the width of the associated reflector plate slot interposed between the first and second retaining flanges;
- inserting the neck portion of at least one bracket through the associated reflector plate slot so that the first and second retaining flanges of the bracket are disposed on opposite sides of the reflector plate such that the reflector plate may rotate away from the open face of the housing via the neck portion and first retaining flange of the bracket and the associated reflector plate slot;
- adjusting each bracket relative to the associated reflector plate slot to selectively position the reflector plate across the width of the housing; and
- adjusting the fastener relative to the flange slot of the second retaining flange of each bracket to selectively position the reflector plate across the length of the housing.

* * * * *